United States Patent Office 3,513,146
Patented May 19, 1970

3,513,146
POLYPROPYLENE-METAL FLUORIDE
COMPOSITION
Herbert Naarmann, Ludwigshafen (Rhine), Germany, assignor to Badische Anilin- & Soda-Fabrik Aktiengesellschaft, Ludwigshafen (Rhine), Germany
No Drawing. Filed July 13, 1967, Ser. No. 653,018
Claims priority, application Germany, July 21, 1966, 1,669,655
Int. Cl. C08f 29/02
U.S. Cl. 260—93.7                              4 Claims

ABSTRACT OF THE DISCLOSURE

Polypropylene molding material which contains a specific amount of a fluoride of a transition metal or of a metal of Group II or III of the Periodic System. This material can be processed into moldings having relatively high transparency.

---

This invention relates to polypropylene molding materials which can be processed into moldings having relatively high transparency.

Conventional polypropylene molding materials, when processed, give moldings having only relatively low transparency.

The object of the present invention is to provide polypropylene molding materials which can be processed into moldings having relatively high transparency.

This object is achieved by polypropylene molding materials containing 0.5 to 60, preferably 5 to 15, parts by weight of a fluoride of a transition metal or of a metal of Group II or III of the Periodic System per 100 parts by weight of polypropylene.

It is surprising that moldings prepared from such molding materials have not only considerable higher transparency but also higher softening points, improved resistance to organic solvents and improved tear resistance, as compared with moldings prepared from comparable conventional molding materials. The new molding materials moreover have a higher flame retardance and the property of polarizing light.

The following may be said with regard to the fluorides to be used in the molding materials according to the invention. Zinc fluoride is particularly suitable. Examples of other very suitable fluorides are cadmium fluoride, tin (II) fluoride, lead (II) fluoride, titanium (III) fluoride, chromium (III) fluoride and manganese (IV) fluoride. Further examples of suitable fluorides are copper (I) fluoride, copper (II) fluoride, silver (I) fluoride, gold (I) fluoride, mercury (II) fluoride, germanium (IV) fluoride, tin (IV) fluoride, zirconium (IV) fluoride, hafnium (IV) fluoride, thorium (III) fluoride, niobium (III) fluoride, tantalum (III) fluoride, molybdenum (V) fluoride, tungsten (IV) fluoride, uranium (III) fluoride, chromium (III) fluoride, iron (II) fluoride, cobalt (II) fluoride, cobalt (III) fluoride, osmium (V) fluoride, lithium fluoride, beryllium fluoride, aluminum fluoride and magnesium fluoride. Double salts of the appropriate fluorides, for example zinc and manganese (IV) hexafluoride, and mixtures of the said fluorides may also be used. The fluorides in question are well known from the literature (cf. for example J. H. Simons, 'Fluorine Chemistry," volume I, volume V, (1964), Academic Press, New York).

Conventional polypropylenes for molding materials, particularly those having an intrinsic viscosity ($\eta$) of 3 to 20, are suitable as polypropylene components for the molding materials according to the invention.

Production of the molding materials from the components may be carried out under conventional conditions with conventional equipment. The molding materials are advantageously prepared in a kneader mixer or a screw mixer, the working temperatures being from 150° to 300° C., preferably from 170° to 220° C. It goes without saying that the fluorides are advantageously used in as finely divided a form as possible.

The molding materials according to this invention may contain, in addition to the fluorides of the transition metals, additives or assistants conventionally used in molding materials, for example dyes, stabilizers and lubricants.

The molding materials according to this invention may be processed in conventional equipment into conventional moldings. They are particularly suitable for the production of films, sheeting and seals.

The invention is illustrated by the following examples in which parts are by weight.

EXAMPLE 1

5 parts of anhydrous zinc fluoride is added to 95 parts of granulated polypropylene having an intrinsic viscosity ($\eta$)=8 and the mixture is homogenized in a kneader for five minutes at 190° C. The mixture while still hot is processed in conventional manner into small test plates. They are transparent, have a tear resistance of 364 kg./sq. cm. and a softening temperature of 168° C.

Test plates prepared in the same way but without zinc fluoride are opaque and have a tear resistance of 296 kg./sq. cm. and a softening point of 168° C.

EXAMPLES 2 TO 13

The procedure of Example 1 is followed with the modifications indicated in the following table in which E=Example No.; PP($\eta$)=parts of Polypropylene and its intrinsic viscosity; Fluoride=amount (in parts) and type of fluoride used; Hti=Homogenisation time in minutes; Hte=homogenisation temperature in 0 C.; TR=tear resistance in kg./sq. cm.; and SP=softening temperature in ° C.

TABLE

| E | PP($\eta$) | Fluoride | Hti | Hte | TR | SP |
|---|---|---|---|---|---|---|
| 2 | 95 (8) | 5 Cadmium | 5 | 210 | 358 | 168 |
| 3 | 90 (8) | 10 Silver (I) | 1 | 200 | 372 | 171 |
| 4 | 85 (8) | 15 Beryllium | 2 | 190 | 375 | 171 |
| 5 | 80 (8) | 20 Aluminum | 10 | 190 | 384 | 173 |
| 6 | 75 (8) | 25 Bismuth (V) | 2 | 190 | 371 | 174 |
| 7 | 70 (8) | 30 Manganese (II) | 30 | 210 | 389 | 176 |
| 8 | 65 (12) | 35 $ZnMnF_6$ | 10 | 215 | 398 | 175 |
| 9 | 60 (12) | 40 Chromium (III) | 40 | 215 | 356 | 178 |
| 10 | 55 (12) | 45 Mercury (II) | 2 | 190 | 352 | 178 |
| 11 | 50 (12) | 30 Zinc / 20 Cobalt | 10 | 190 | 340 | 180 |
| 12 | 90 (5) | 10 Lithium | 4 | 230 | 376 | 168 |
| 13 | 90 (16) | 10 Lead (II) | 4 | 220 | 390 | 169 |

All the test plates obtained according to the present examples are transparent.

Test plates prepared in the same way but without fluorides are opaque; they have tear resistance of 303, 290 and 312 kg./sq. cm. at $(\eta)=12$, 5 and 16 respectively.

I claim:
1. Polypropylene molding material containing, per 100 parts by weight of polypropylene, 0.5 to 60 parts by weight of a fluoride of a transition metal or a metal of Group II or Group III of the Periodic System.
2. Polypropylene molding material containing, per 100 parts by weight of polypropylene, 5 to 15 parts by weight of a fluoride of a transition metal or a metal of Group II or Group III of the Periodic System.
3. Polypropylene molding material as claimed in claim 1 wherein the fluoride used is zinc fluoride.
4. Polypropylene molding material as claimed in claim 1 wherein the polypropylene has an intrinsic viscosity of from 3 to 20.

References Cited

UNITED STATES PATENTS 3,332,906  7/1967  Aboulafia _____ 260—41

FOREIGN PATENTS 931,889  7/1963  Great Britain.

JOSEPH L. SCHOFER, Primary Examiner

S. M. LEVIN, Assistant Examiner

U.S. Cl. X.R.

260—94.9